US011668224B2

(12) United States Patent
Mendoza-Pinon et al.

(10) Patent No.: US 11,668,224 B2
(45) Date of Patent: Jun. 6, 2023

(54) EXHAUST CATALYST TRACKING AND NOTIFICATION SYSTEM

(71) Applicant: Cummins Inc., Columbus, IN (US)

(72) Inventors: Arturo Mendoza-Pinon, Columbus, IN (US); Atin Tandon, Greenwood, IN (US); Daniel J. Robinson, Columbus, IN (US); Frank Ruggiero, Columbus, IN (US); Hasan Mohammed, Charleston, SC (US); David L. Hirt, Columbus, IN (US); Matthew W. Isaacs, Monds Corner, SC (US)

(73) Assignee: Cummins Inc., Columbus, IN (US)

( * ) Notice: Subject to any disclaimer, the term of this patent is extended or adjusted under 35 U.S.C. 154(b) by 163 days.

(21) Appl. No.: 16/858,948

(22) Filed: Apr. 27, 2020

(65) Prior Publication Data

US 2020/0347770 A1 Nov. 5, 2020

Related U.S. Application Data

(60) Provisional application No. 62/840,716, filed on Apr. 30, 2019.

(51) Int. Cl.
*F01N 9/00* (2006.01)
*F02D 41/14* (2006.01)
*F01N 11/00* (2006.01)

(52) U.S. Cl.
CPC ............. *F01N 9/007* (2013.01); *F01N 11/00* (2013.01); *F02D 41/1447* (2013.01); *F02D 41/1463* (2013.01)

(58) Field of Classification Search
CPC ........ F01N 9/007; F01N 11/00; F01N 3/2066; F01N 2560/026; F01N 2560/14; F01N 2550/02; F01N 2900/16; F01N 2900/1602; F01N 2900/1621; Y02T 10/12; Y02T 10/40; F02D 41/1447; F02D 41/1463
See application file for complete search history.

(56) References Cited

U.S. PATENT DOCUMENTS

| 8,276,438 | B2 | 10/2012 | Votsmeier et al. |
| 8,538,721 | B2 | 9/2013 | Sacco et al. |
| 8,733,083 | B2 | 5/2014 | Ofoli et al. |
| 9,475,006 | B2 | 10/2016 | Ofoli et al. |

(Continued)

FOREIGN PATENT DOCUMENTS

| CN | 104234802 A | 12/2014 |
| WO | WO-2016/051038 | 4/2016 |

(Continued)

*Primary Examiner* — Audrey B. Walter
*Assistant Examiner* — Dapinder Singh
(74) *Attorney, Agent, or Firm* — Foley & Lardner LLP (57) ABSTRACT

Systems and apparatuses include a circuit structured to receive information indicative of a catalyst health, receive information from a sensor array indicative of a catalyst activity, determine a catalyst health management criteria has been met based on the information, determine a catalyst age based on the information indicative of the catalyst activity and the catalyst health management criteria being met, compare the determined catalyst age to a predetermined age threshold, and provide a notification when the determined catalyst age exceeds the predetermined age threshold.

19 Claims, 2 Drawing Sheets

(56) References Cited

U.S. PATENT DOCUMENTS

| | | | |
|---|---|---|---|
| 2005/0060986 A1* | 3/2005 | Ohsuga | B01D 53/8696 |
| | | | 60/277 |
| 2014/0065041 A1* | 3/2014 | Szailer | F01N 3/20 |
| | | | 423/212 |
| 2015/0292383 A1* | 10/2015 | Devarakonda | F01N 3/101 |
| | | | 60/274 |
| 2017/0350291 A1 | 12/2017 | Khaled | |
| 2018/0043335 A1* | 2/2018 | Grubert | B01J 23/10 |

FOREIGN PATENT DOCUMENTS

| WO | WO-2018/065141 | 4/2018 |
|---|---|---|
| WO | WO-2018/069039 | 4/2018 |

\* cited by examiner

FIG. 3

EXHAUST CATALYST TRACKING AND NOTIFICATION SYSTEM

CROSS REFERENCE TO RELATED APPLICATION

This application claims the benefit of U.S. Provisional Patent Application No. 62/840,716, filed on Apr. 30, 2019, which is incorporated herein by reference in its entirety.

TECHNICAL FIELD

The present disclosure relates to engine exhaust aftertreatment systems. More particularly, the present disclosure relates to systems and methods for monitoring a catalyst of an exhaust aftertreatment system.

BACKGROUND

Catalyst health management (CHM) systems monitor a catalyst within an aftertreatment system (e.g., a catalyst within a selective catalytic reduction system). Older engine systems and aftertreatment systems may not be equipped with a CHM system and do not include actuators that could allow a CHM system to actively reduce catalyst loading or otherwise improve catalyst health without intervention of a human operator.

The catalyst in a selective catalytic reduction system (SCR) is often provided to a user with a recommended lifespan. After the measured lifespan, the user should replace the catalyst. For example, in some installations, a catalyst may be rated for 20,000 hours of use before replacement is recommended. However, depending on the particular use of the engine system and the flow of exhaust gases, the real world useable lifespan of the catalyst may be longer than 20,000 hours or shorter than 20,000 hours. For example, high loading over prolonged periods may reduce the real world lifespan of the catalyst below 20,000 hours.

SUMMARY

One embodiment relates to a circuit structured to receive information indicative of a catalyst health, receive information from a sensor array indicative of a catalyst activity, determine a catalyst health management criteria has been met based on the information, determine a catalyst age based on the information indicative of the catalyst activity and the catalyst health management criteria being met, compare the determined catalyst age to a predetermined age threshold, and provide a notification when the determined catalyst age exceeds the predetermined age threshold.

Another embodiment relates to a system that includes a sensor array associated with an aftertreatment system and structured to collect information indicative of a catalyst health, and a controller coupled to the sensor array. The controller includes an NOx age circuit structured to determine a NOx catalyst age based on the information indicative of the catalyst health, a temperature age circuit structured to determine a temperature catalyst age based on the information indicative of the catalyst health, a warning circuit structured to generate a warning status when at least one of the NOx catalyst age or the temperature catalyst age equals or exceeds a predetermined warning threshold, an alarm circuit structured to generate an alarm status when at least one of the NOx catalyst age or the temperature catalyst age equals or exceeds a predetermined alarm threshold, and a notification circuit structured to send a warning signal to a user interface when the warning status is generated by the warning circuit, and send an alarm signal to the user interface when the alarm status is generated by the alarm circuit.

Another embodiment relates to a method that includes determining a catalyst age of a catalyst based on at least one of a NOx efficiency or a temperature of exhaust gas entering the catalyst, generating a warning signal when the catalyst age equals or exceeds a warning threshold, and providing a warning indication of the warning signal via a user interface.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for an engine exhaust aftertreatment system that monitors a catalyst age over time and provides a warning and/or an alert when catalyst age becomes high, such as above a preset or predefined threshold. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for a system that monitors a catalyst health parameter over time to determine a catalyst age. In some examples, the system monitors a temperature and/or a NOx efficiency of exhaust gases entering the exhaust aftertreatment system. The system provides a warning notification when the catalyst age exceeds a warning threshold, and an alarm notification when the catalyst age exceeds an alarm threshold. The warning notification and the alarm notification may be sent to a notification device that uses audio and/or visual indicators to instruct a user or operator to increase a loading on the engine (e.g., revving the engine, etc.).

Figure 1:
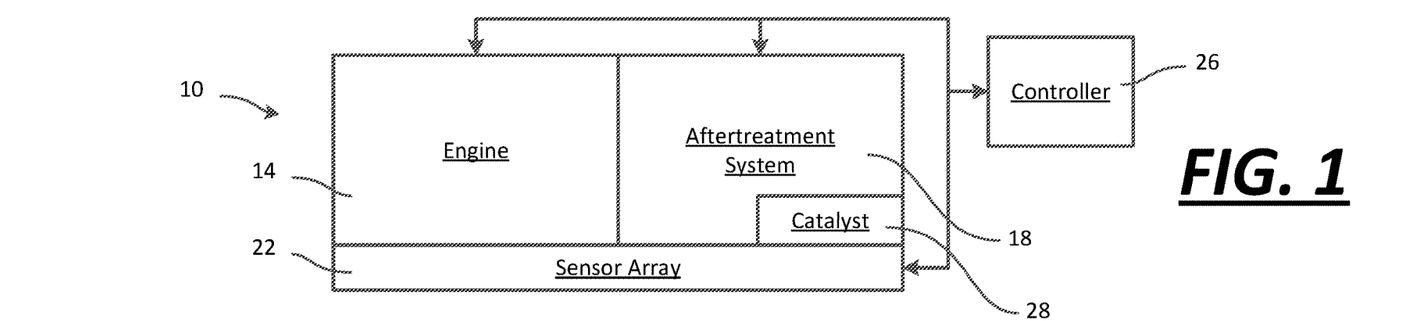
FIG. 1 is a schematic view of an engine system according to some embodiments.

As shown in FIG. 1, an engine system 10 includes an internal combustion engine 14, an engine exhaust aftertreatment system 18 that treats the exhaust of the engine 14, a sensor array 22 that monitors conditions of the engine 14 and the aftertreatment system 18, and a controller 26 coupled to the engine 14, the aftertreatment system 18, and the sensor array 22 to control, at least partly, operation of the engine 14 and the aftertreatment system 18. In some embodiments, the engine 14 is a diesel engine used in a marine application or in a vehicle. In the example shown, the engine 14 is a compression-ignition engine that utilizes diesel fuel. Of course, in other embodiments, different engine configurations are possible, such as a spark-ignition engine. In some embodiments, the engine system 10 is not equipped with an electronic throttling valve, a turbo wastegate, a variable geometry turbo, and/or post injection systems.

In the example shown, the aftertreatment system 18 includes a selective catalytic reduction (SCR) system including a catalyst 28. SCR systems convert nitrogen oxides present in the exhaust gases produced by the engine 14 into diatomic nitrogen and water through oxidation within the catalyst 28. A diesel exhaust fluid (DEF) is added to the exhaust gas stream to aid in the catalytic reduction. During idle or other low load operations, the catalyst 28 can become loaded with undesirable exhaust gas species, coke, and/or particulate matter deposits. Loading of the catalyst 28 can lead to exothermal events such as sparking or burning that can reduce the usable life of the catalyst 28. For example, one situation includes going from a condition where the SCR was loaded with undesirable particles to a high load condition (particularly, high exhaust gas temperature). As a result, at least some of the undesirable particles may burn off at an uncontrollable rate, which causes the temperature to exceed desired operating temperatures. This temperature may lead to deactivation in the catalyst 28, which reduces the efficacy of the catalyst 28. Therefore, it is desirable to avoid excessive loading of the catalyst 28.

Loading and regular use degrade the catalyst 28 over time. The catalyst 28 is constructed with a target lifespan. For example, the catalyst 28 may be constructed to last 20,000 hours of use. However, the target lifespan is an estimate and does not account for actual use, environmental factors, excessive loading, or other factors that contribute to extending or shortening the real world lifespan of the catalyst 28.

The sensor array 22 includes many sensors, both real and virtual (or any combination thereof, such as all real, all virtual, a majority real, etc.), arranged to measure or otherwise acquire data, values, or information regarding attributes of the engine 14 and the aftertreatment system 18.

In some embodiments, the sensor array 22 includes a temperature sensor positioned between the engine 14 and the aftertreatment system 18 and structured to send a signal to the controller 26 indicative of the temperature of exhaust gases exiting the engine 14 and entering the aftertreatment system 18. In some embodiments, the sensor array 22 includes a temperature sensor structured to detect a temperature of exhaust gases exiting the engine 14. In some embodiments, the sensor array 22 includes a temperature sensor positioned to detect a temperature of exhaust gases entering the catalyst 28.

In some embodiments, the sensor array 22 includes oxygen sensors and/or an array of sensors positioned to measure exhaust gas species (e.g., NOx, COx, etc.) both upstream and downstream of the catalyst 28. In some embodiments, the sensor array 22 may provide signals indicative of exhaust gas species concentrations both upstream and downstream of the catalyst 28. In some embodiments, the sensor array 22 includes oxygen sensors, pressure sensors, mass flow sensors, or other types of sensors for determining a characteristic of exhaust gas species entering the aftertreatment system 18 and/or exiting the aftertreatment system 18.

The controller 26 is structured to at least partly control the engine 14 and the aftertreatment system 18. The controller 26 is coupled with the sensor array 22 and receives signals therefrom. The controller 26 uses the signals received from the sensor array 22 to determine a catalyst age and perform certain actions, at least some of which are described herein below, in response to the values, information, and/or data received from the sensor array. The catalyst age is defined as a time value that increases based on use. For example, heavy use of the catalyst 28 may result in the catalyst age being different that the number of hours that the catalyst 28 was used (i.e., a run time of the catalyst 28). In the heavy use example, the catalyst age may be determined to be 150 hours while the actual run time of the catalyst 28 is only 100 hours. In other cases, the catalyst age can be less than the run time of the catalyst 28 or the same as the run time of the catalyst 28.

As the components of FIG. 1 are shown to be embodied in a vehicle or a marine application, the controller 26 may be structured as one or more electronic control units (ECU). The controller 26 may be separate from or included with at least one of a transmission control unit, an exhaust aftertreatment control unit, a powertrain control module, an engine control module, etc. The function and structure of the controller 26 is described in greater detail in FIG. 2.

Figure 2:
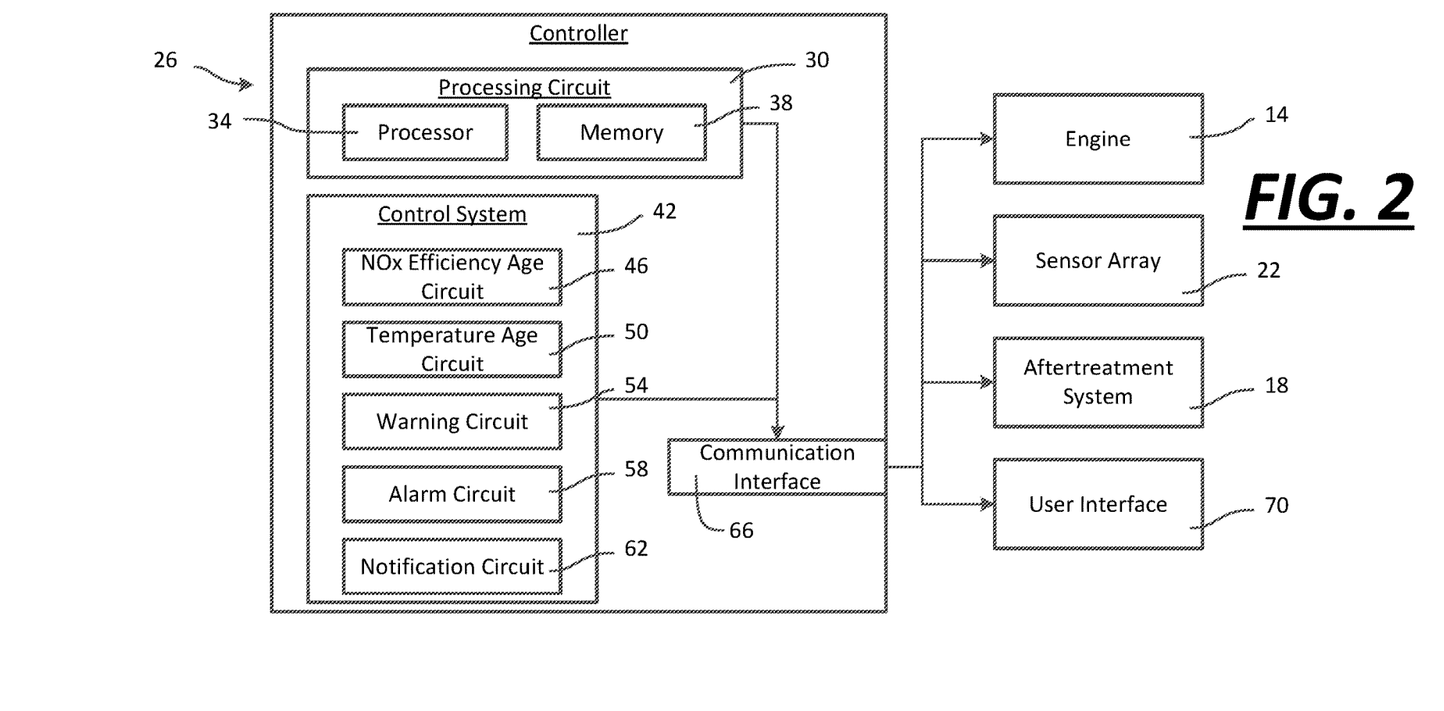
FIG. 2 is a schematic view of a controller of the engine system of FIG. 1.

Referring now to FIG. 2, a schematic diagram of the controller 26 of the engine system 10 of FIG. 1 is shown according to an example embodiment. As shown in FIG. 2, the controller 26 includes a processing circuit 30 having a processor 34 and a memory device 38, a control system 42 having a NOx efficiency age circuit 46, a temperature age circuit 50, a warning circuit 54, an alarm circuit 58, and a notification circuit 62, and a communications interface 66.

In one configuration, the NOx efficiency age circuit 46, the temperature age circuit 50, the warning circuit 54, the alarm circuit 58, and the notification circuit 62 are embodied as machine or computer-readable media that is executable by a processor, such as processor 34. The machine or computer-readable medium may be stored by one or more memory devices, such as that described below with respect to memory device 38. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the NOx efficiency age circuit 46, the temperature age circuit 50, the warning circuit 54, the alarm circuit 58, and the notification circuit 62 are embodied as hardware units, such as electronic control units. As such, the NOx efficiency age circuit 46, the temperature age circuit 50, the warning circuit 54, the alarm circuit 58, and the notification circuit 62 may be embodied as one or more circuitry components including, but not limited to, processing circuitry, network interfaces, peripheral devices, input devices, output devices, sensors, etc. In some embodiments, the NOx efficiency age circuit 46, the temperature age circuit 50, the warning circuit 54, the alarm circuit 58, and the notification circuit 62 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the NOx efficiency age circuit 46, the temperature age circuit 50, the warning circuit 54, the alarm circuit 58, and the notification circuit 62 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The NOx efficiency age circuit 46, the temperature age circuit 50, the warning circuit 54, the alarm circuit 58, and the notification circuit 62 may also include programmable hardware devices such as field programmable gate arrays, programmable array logic, programmable logic devices or the like. The NOx efficiency age circuit 46, the temperature age circuit 50, the warning circuit 54, the alarm circuit 58, and the notification circuit 62 may include one or more memory devices for storing instructions that are executable by the processor(s) of the NOx efficiency age circuit 46, the temperature age circuit 50, the warning circuit 54, the alarm circuit 58, and the notification circuit 62. The one or more memory devices and processor(s) may have the same definition as provided below with respect to the memory device 38 and processor 34. In some hardware unit configurations, the NOx efficiency age circuit 46, the temperature age circuit 50, the warning circuit 54, the alarm circuit 58, and the notification circuit 62 may be geographically dispersed throughout separate locations in the vehicle or marine application. Alternatively and as shown, the NOx efficiency age circuit 46, the temperature age circuit 50, the warning circuit 54, the alarm circuit 58, and the notification circuit 62 may be embodied in or within a single unit/housing, which is shown as the controller 26.

In the example shown, the controller 26 includes a processing circuit 30 having a processor 34 and a memory device 38. The processing circuit 30 may be structured or configured to execute or implement the instructions, commands, and/or control processes described herein with respect to NOx efficiency age circuit 46, the temperature age circuit 50, the warning circuit 54, the alarm circuit 58, and the notification circuit 62. The depicted configuration represents the NOx efficiency age circuit 46, the temperature age circuit 50, the warning circuit 54, the alarm circuit 58, and the notification circuit 62 as machine or computer-readable media. However, as mentioned above, this illustration is not meant to be limiting as the present disclosure contemplates other embodiments where the NOx efficiency age circuit 46, the temperature age circuit 50, the warning circuit 54, the alarm circuit 58, and the notification circuit 62, or at least one circuit of the NOx efficiency age circuit 46, the temperature age circuit 50, the warning circuit 54, the alarm circuit 58, and the notification circuit 62, is configured as a hardware unit. All such combinations and variations are intended to fall within the scope of the present disclosure.

The processor 34 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., NOx efficiency age circuit 46, the temperature age circuit 50, the warning circuit 54, the alarm circuit 58, and the notification circuit 62 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 38 (e.g., RAM, ROM, Flash Memory, hard disk storage, etc.) may store data and/or computer code for facilitating the various processes described herein. The memory device 38 may be communicably connected to the processor 34 to provide computer code or instructions to the processor 34 for executing at least some of the processes described herein. Moreover, the memory device 38 may be or include tangible, non-transient volatile memory or non-volatile memory. Accordingly, the memory device 38 may include database components, object code components, script components, or any other type of information structure for supporting the various activities and information structures described herein.

The NOx efficiency age circuit 46 is structured to communicate with the sensor array 22 via the communications interface 66 and to determine a NOx catalyst age parameter based on information received from the sensor array 22. In some embodiments, the NOx catalyst age parameter is a NOx conversion efficiency of the aftertreatment system 18. In some embodiments the NOx conversion efficiency is determined based on signals received from the sensor array 22 in the form of a NOx input sensor positioned upstream of the catalyst 28 and a NOx output sensor positioned downstream of the catalyst 28 (i.e., input NOx amount minus output NOx amount divided by input NOx amount is equal to a value indicative of how much NOx is being converted to less harmful compounds over a predefined period of time). The NOx efficiency age circuit 46 is further structured to determine a NOx catalyst age. In some embodiments, the NOx catalyst age is determined using a non-linear model that is a function of time and the determined NOx conversion efficiency. One or more processes, algorithms, formulas, and the like may be used to determine the NOx catalyst age based actual usage and a NOx operating parameter (e.g., conversion efficiency) is determined as follows. A look-up table may be used where the two inputs are actual usage (e.g., hours of operation or run time) and conversion efficiency. Based on these two inputs, a NOx catalyst age is determined. This table may be constructed from experimental data that is acquired for a variety of different engine-exhaust aftertreatment systems thereby producing multiple tables that are specific to certain arrangements. Thus, this NOx catalyst age is not solely the actual usage amount or run time, but represents the actual usage amount in combination with the loading experienced by the catalyst. As another example, as NOx conversion efficiency deviates from an ideal or desired value over time, the NOx catalyst age increases as a function of the magnitude of the deviation and the amount of time. In some embodiments, the relationship between the deviation and the NOx catalyst age is linear, non-linear, experimentally modeled, fit to a curve model, or determined by an algorithm that utilizes other inputs. In some embodiments, the model or look up tables may be stored in the memory device 38 and referenced or queried by the NOx efficiency age circuit 46.

The temperature age circuit 50 is structured to communicate with the sensor array 22 via the communications interface 66 and to determine a temperature catalyst age parameter based on information received from the sensor array 22. In some embodiments, the temperature catalyst age parameter is an input temperature and/or an output temperature of the aftertreatment system 18. In some embodiments the temperature catalyst age is determined based on signals received from the sensor array 22 in the form of a temperature input sensor positioned upstream of the catalyst 28 and a temperature output sensor positioned downstream of the catalyst 28. The temperature age circuit 50 is further structured to determine a temperature catalyst age. In some embodiments, the temperature catalyst age is determined using a non-linear model that is a function of time and the measured temperatures. For example, as temperature deviates from an ideal or desired value or range of values over time, the temperature catalyst age increases as a function of the magnitude of the deviation and the amount of time. In some embodiments, the relationship between the deviation and the temperature catalyst age is linear, non-linear, experimentally modeled, fit to a curve model, or determined by an algorithm that utilizes other inputs. In some embodiments, the model or look up tables may be stored in the memory device 38 and referenced or queried by the temperature age circuit 50. One or more processes, algorithms, formulas, and the like may be used to determine the temperature catalyst age based actual usage and a temperature catalyst age parameter (e.g., temperature differential between downstream temperature and upstream temperature) is determined as follows. A look-up table may be used where the two inputs are actual usage (eg., hours of operation) and temperature differential. Based on these two inputs, a temperature catalyst age is determined. This table may be constructed from experimental data that is acquired for a variety of different engine-exhaust aftertreatment systems thereby producing multiple tables that are specific to certain arrangements.

In some embodiments, the NOx efficiency age circuit 46 and/or the temperature age circuit 50 may utilize a mass flow rate of exhaust gases entering the aftertreatment system 18 determined based on oxygen sensor and mass flow sensor information. In some embodiments, the mass flow rate or other input received from the sensor array 22 is a theoretical, estimated, or otherwise determined value for a particular exhaust species (e.g., NOx) or group of exhaust species entering the aftertreatment system 18 based on information from a variety of sensors, real and/or virtual. In some embodiments, the catalyst age parameters include a combination of the above-mentioned parameters. The catalyst age parameters are generally indicative of a characteristic, such as quantity of exhaust gas species entering or loading onto the catalyst 28 of the aftertreatment system 18.

In some embodiments, the NOx catalyst age and the temperature catalyst age are represented by a cumulative catalyst age in the form of a cumulative time (e.g., an age of 10,000 hours from new), a remaining life (e.g., 5,000 hours remaining), a percentage (e.g., 50% catalyst age remaining), etc. In some embodiments, the catalyst ages can be calibrated values (e.g., 1-10 with 10 indicating a maximum age) dependent on the arrangement of the engine 14 and aftertreatment system 18.

The warning circuit 54 is coupled with the NOx efficiency age circuit 46 and the temperature age circuit 50 and utilizes a warning threshold stored in the memory device 38. The warning circuit 54 compares the NOx catalyst age and/or the temperature catalyst age to the warning threshold and determines a warning status if the NOx catalyst age and/or the temperature catalyst age passes, exceeds, or is otherwise at or above the warning threshold. In some embodiments, the warning threshold is 2,000 hours and the warning status indicates that the catalyst age (e.g., the temperature catalyst age and/or the NOx catalyst age) has reached the warning threshold and that the catalyst 28 should be replaced within the next 2,000 hours of use. In some embodiments, the warning threshold is more than 2,000 hours, less than 2,000 hours, or corresponds to a different value corresponding to the NOx catalyst age and/or the temperature catalyst age (e.g., a percentage). In some embodiments, the warning status is determined if the NOx catalyst age is less than or equal to the warning threshold. In some embodiments, the warning status is determined if the temperature catalyst age is less than or equal to the warning threshold. In some embodiments, the warning status is determined if the NOx catalyst age and the temperature catalyst age are both less than or equal to the warning threshold.

The alarm circuit 58 is coupled with the NOx efficiency age circuit 46 and the temperature age circuit 50 and utilizes an alarm threshold stored in the memory device 38. The alarm circuit 58 compares the NOx catalyst age and/or the temperature catalyst age to the alarm threshold and determines an alarm status if the NOx catalyst age and/or the temperature catalyst age passes the alarm threshold. In some embodiments, the alarm threshold is 300 hours and the alarm status indicates that the catalyst 28 should be replaced within the next 300 hours of use. In some embodiments, the alarm threshold is more than 300 hours, less than 300 hours, or corresponds to a different value corresponding to the NOx catalyst age and/or the temperature catalyst age (e.g., a percentage). In some embodiments, the alarm status is determined if the NOx catalyst age is less than or equal to the alarm threshold. In some embodiments, the alarm status is determined if the temperature catalyst age is less than or equal to the alarm threshold. In some embodiments, the alarm status is determined if the NOx catalyst age and the temperature catalyst age are both less than or equal to the alarm threshold.

The notification circuit 62 is structured to receive the warning status from the warning circuit 54 and provide a warning signal to a user interface 70 via the communication interface 66. In some embodiments, the warning signal provides an audio, visual, or audio-visual warning that is observable by a user of the engine 14 and indicates that the catalyst 28 will need to be replaced soon. In some embodiments, the warning signal provides an indication of useful hours remaining. In some embodiments, the warning signal provides only an audio or only a visual indication via the user interface 70 (e.g., a lit yellow lamp).

The notification circuit 62 is further structured to receive the alarm status from the alarm circuit 58 and provide an alarm signal to the user interface 70 via the communication interface 66. In some embodiments, the alarm signal prompts an audio, visual, or audio-visual alarm that is observable by a user of the engine 14 and instructs the user that the catalyst 28 should be replaced in the immediate future. In some embodiments, the alarm signal provides an indication of useful hours remaining. In some embodiments, the alarm signal prompts only an audio or only a visual indication via the user interface 70 (e.g., a lit red lamp).

In some embodiments, only one of the warning status and the alarm status is used, so that the operator only receives one type of indication that catalyst requires replacement. In some embodiments, the user interface 70 is operator customizable. For example, a dial type display can be used where a warning status is indicated in a yellow section, and an alarm status is indicated in a red section. In some embodiments, audible alarms or instructions are provided.

In some embodiments, the warning circuit 54 and the alarm circuit 58 are eliminated and the NOx efficiency age circuit 46 and the temperature age circuit 50 provides the NOx catalyst age and/or the temperature catalyst age to the notification circuit 62. The notification circuit 62 then communicates with the user interface 70 via the communications interface 66 and the NOx catalyst age, the temperature catalyst age, both, or some combination of the two is provided directly to the operator. In some embodiments, the notification circuit 62 is structured to correlate one or more of the catalyst ages to a simple count (e.g., a discrete number for display), or age of the catalyst 28.

In some embodiments, the notification circuit 62 is structured to log a fault code in the memory device 38 or broadcast a fault code to a remote memory (e.g., a server or network) if a warning status or an alarm status are sent. The fault codes can be stored in a data log and used for future service, maintenance, or repair. The data log can track times and conditions related to the warning status and/or alarm status. For example, a data file containing temperature history and/or NOx efficiency history may be stored.

Figure 3:
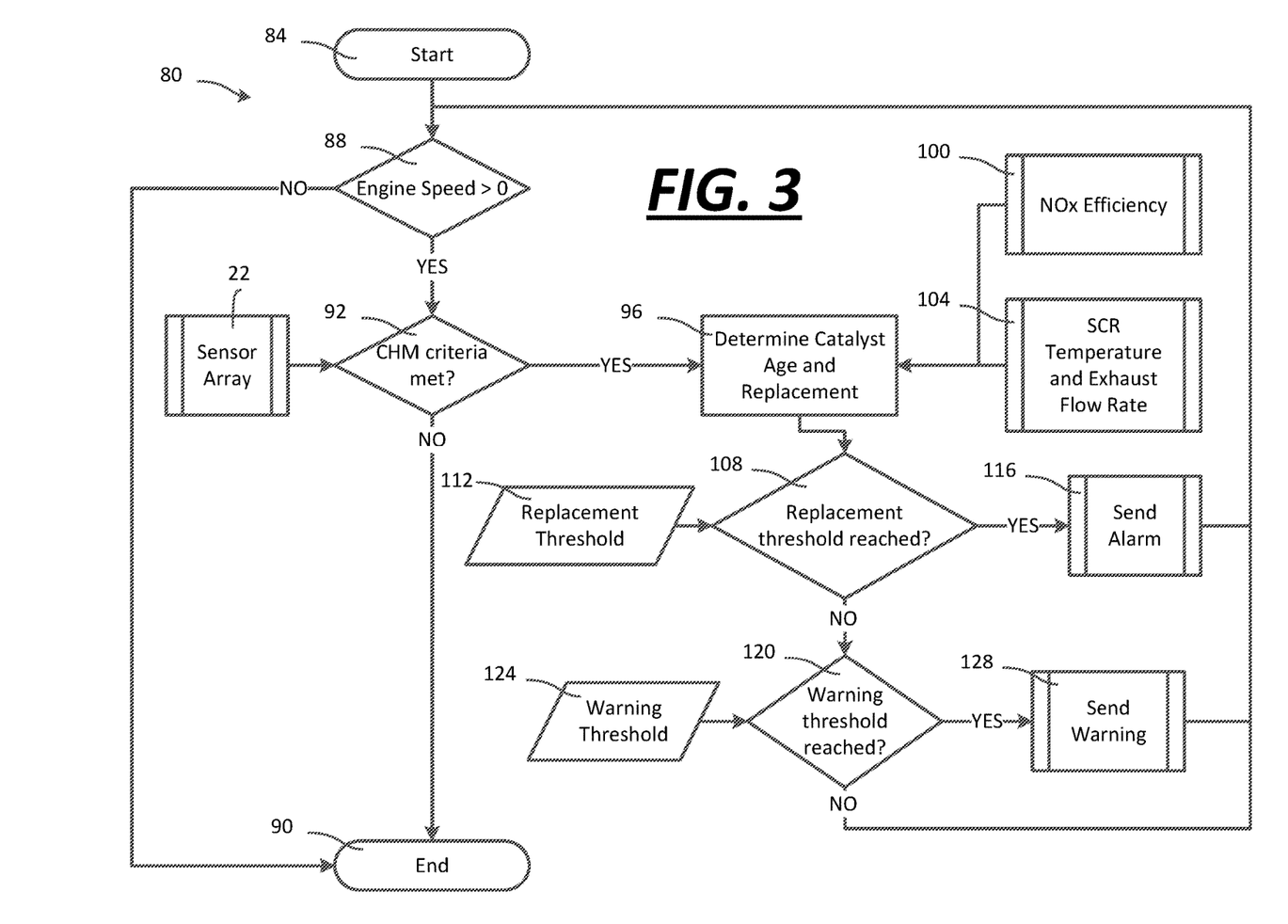
FIG. 3 is a flow diagram of a method of operating the engine system of FIG. 1 according to some embodiments.

As shown in FIG. 3, the controller 26 is structured to execute a method 80 for monitoring catalyst health. The method 80 starts at step 84 and the speed of the engine 14 is monitored at step 88. If the speed of the engine 14 is zero, the method 80 determines that the engine 14 is not running and ends the method at step 90. If the speed of the engine 14 is non-zero, the method 80 proceeds to step 92 where a catalyst health management criteria is checked.

The catalyst health management criteria indicates that the catalyst 28 is likely subject to activity that will degrade the catalyst 28 (e.g., the engine 14 is running) and that the controller 26 should start determining the catalyst age. In some embodiments, the catalyst health management criteria includes a threshold temperature and a time (e.g., the engine 14 or the input to the aftertreatment system 18 has achieved a threshold temperature for a predetermined amount of time). In some embodiments, the catalyst health management criteria includes a determination if urea or diesel exhaust fluid has been dosed for equal to or greater than a threshold time. Other catalyst health management criteria are contemplated, such as time at idle, a measured mass flow of exhaust gas species, a NOx efficiency, or an engine speed, for example.

If the catalyst health management criteria is met at step 92, the method 80 proceeds to step 96 and the catalyst age is determined. In some embodiments, the NOx efficiency age circuit 46 and the temperature age circuit 50 cooperate to track or count the catalyst age of the catalyst 28. In some embodiments, the catalyst age starts at zero hours and increments based on the functions or algorithms of the NOx efficiency age circuit 46 and/or the temperature age circuit 50. For example, the NOx efficiency age circuit 46 and the temperature age circuit 50 determines the NOx catalyst age at step 100 and the temperature catalyst age at step 104 independently, then a catalyst age may be determined at step 96 based on the NOx catalyst age and the temperature catalyst age. For example a weighted average model may be used. In some embodiments, the temperature catalyst age may not be used in the method 80, but rather used as a backup determination. For example, the temperature catalyst age may be determined and stored, but not communicated to a user. A technician or other authorized individual or system may be provided access to the temperature catalyst age so that the temperature catalyst age can be accessed and utilized, but it is not the primary determination of catalyst age. In some embodiments, the temperature catalyst age is not used and the temperature age circuit 50 can be eliminated.

At step 108, the catalyst age is compared by the alarm circuit 58 to an alarm threshold received at step 112 from the memory device 38. If the catalyst age has reached the alarm threshold, the alarm circuit 58 provides an alarm status to the notification circuit at step 116. In some embodiments, the alarm circuit 58 provides the alarm status when the catalyst age is greater than the alarm threshold. The alarm status is then relayed to the user interface 70 and the user is prompted to replace the catalyst 28. In some embodiments, the catalyst age indicates a remaining lifespan of the catalyst 28 and the alarm status is determined when the catalyst age is less than or equal to the alarm threshold. In some embodiments, the alarm status indicates that the catalyst 28 should be replaced within 300 hours. In some embodiments, the alarm status indicates more or less than 300 hours for replacement. In some embodiments, the user interface 70 includes a red lamp that illuminates and indicates to the user that the catalyst 28 should be replaced at the next opportunity.

If the alarm threshold has not been reached at step 108, the method 80 proceeds to step 120 where the catalyst age is compared by the warning circuit 54 to a warning threshold received at step 124 from the memory device 38. If the catalyst age has reached the warning threshold, the warning circuit 54 provides a warning status to the notification circuit at step 128. In some embodiments, the warning circuit 54 provides the warning status when the catalyst age is greater than the warning threshold. The warning status is then relayed to the user interface 70 and the user is prompted to schedule replacement of the catalyst 28. In some embodiments, the catalyst age indicates a remaining lifespan of the catalyst 28 and the warning status is determined when the catalyst age is less than or equal to the warning threshold. In some embodiments, the warning status indicates that the catalyst 28 should be replaced within 2,000 hours. In some embodiments, the warning status indicates more or less than 2,000 hours for replacement. In some embodiments, the user interface 70 includes a yellow lamp that illuminates and indicates to the user that a replacement of the catalyst 28 should be scheduled in the near future.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-4, it should be understood that the controller 26 may include any number of circuits for completing the functions described herein. For example, the activities and functionalities of the NOx efficiency age circuit 46, the temperature age circuit 50, the warning circuit 54, the alarm circuit 58, and the notification circuit 62 may be combined in multiple circuits or as a single circuit. Additional circuits with additional functionality may also be included. Further, the controller 26 may further control other activity beyond the scope of the present disclosure.

As mentioned above and in one configuration, the "circuits" may be implemented in machine-readable medium for execution by various types of processors, such as processor 34 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a circuit structured to:
receive information indicative of a catalyst health;
receive information from a sensor array indicative of a catalyst activity;
determine a catalyst health management criteria is met based on the information, the catalyst health management criteria indicative of a potential degradation of the catalyst health and comprising a time-based reductant dosing value, an exhaust gas flow value, or an engine operation value;
based on the catalyst health management criteria being met, determine a cumulative catalyst age from new based on a time value and on usage parameters including the information indicative of the catalyst activity;
compare the determined cumulative catalyst age to a predetermined age threshold; and
provide a notification when the determined cumulative catalyst age exceeds the predetermined age threshold.

2. The apparatus of claim 1, wherein the information indicative of the catalyst activity includes a NOx efficiency.

3. The apparatus of claim 1, wherein the information indicative of the catalyst activity includes information received from a NOx input sensor positioned upstream of a catalyst and a NOx output sensor positioned downstream of the catalyst.

4. The apparatus of claim 1, wherein the information indicative of the catalyst activity includes a temperature upstream of a catalyst and a temperature downstream of the catalyst.

5. The apparatus of claim 1, wherein the usage parameters include a temperature catalyst age and a NOX catalyst age, and wherein the cumulative catalyst age is determined based on the temperature catalyst age and the NOX catalyst age.

6. The apparatus of claim 1, wherein determining the cumulative catalyst age includes querying a lookup table using the information indicative of the catalyst health and a run time as inputs to the lookup table.

7. The apparatus of claim 1, wherein the notification includes at least one of a graphical display or an audible alarm instruction to schedule a replacement of a catalyst.

8. A system comprising:
a sensor array associated with an after treatment system and structured to collect information indicative of a potential degradation of a catalyst health and comprising a time-based reductant dosing value, an exhaust gas flow value, or an engine operation value; and
a controller coupled to the sensor array, the controller including:
an NOx age circuit structured to determine a NOx catalyst age based on the information indicative of the catalyst health;
a temperature age circuit structured to determine a temperature catalyst age based on the information indicative of the catalyst health;
wherein at least one of the NOx age circuit or the temperature age circuit determines a cumulative catalyst age from new based on the NOx catalyst age and the temperature catalyst age;

a warning circuit structured to generate a warning status when the cumulative catalyst age equals or exceeds a predetermined warning threshold;

an alarm circuit structured to generate an alarm status when the cumulative catalyst age equals or exceeds a predetermined alarm threshold; and a notification circuit structured to send a warning signal to a user interface when the warning status is generated by the warning circuit, and send an alarm signal to the user interface when the alarm status is generated by the alarm circuit.

9. The system of claim 8, wherein the sensor array includes a NOx input sensor positioned upstream of a catalyst and a NOx output sensor positioned downstream of the catalyst, and wherein the NOx age circuit determines the NOx catalyst age based on a NOx efficiency determined based on information received from the NOx input sensor and NOx output sensor.

10. The system of claim 8, wherein the sensor array includes a temperature input sensor positioned upstream of a catalyst and a temperature output sensor positioned downstream of the catalyst, and wherein the temperature age circuit determines the temperature catalyst age based on a temperature differential between the information collected by the temperature input sensor and the temperature output sensor.

11. The system of claim 8, wherein the cumulative catalyst age is determined using a weighted average.

12. The system of claim 8, wherein the warning signal results in a notification via the user interface that indicates a catalyst replacement should be scheduled within a first time frame, and wherein the alarm signal results in a notification via the user interface that indicates the catalyst replacement should be scheduled within a second time frame, shorter than the first time frame.

13. The system of claim 8, wherein the NOx catalyst age and the temperature catalyst age increase with operation of the after treatment system over time.

14. A method comprising:

based on a catalyst health management criteria being met, determining a cumulative catalyst age from new of a catalyst based on a time value and on usage parameters including at least one of a NOx efficiency or a temperature of exhaust gas entering the catalyst, the catalyst health management criteria indicative of a potential degradation of the catalyst health and comprising a time-based reductant dosing value, an exhaust gas flow value, or an engine operation value;

generating a warning signal when the cumulative catalyst age equals or exceeds a warning threshold; and providing a warning indication of the warning signal via a user interface.

15. The method of claim 14, further comprising:

generating an alarm signal when the catalyst age equals or exceeds an alarm threshold; and providing an alarm indication of the alarm signal via the user interface.

16. The method of claim 15, wherein the alarm threshold is closer to the end of a catalyst life than the warning threshold.

17. The method of claim 14, wherein the cumulative catalyst age is determined based on a NOx catalyst age and a temperature catalyst age, and wherein the NOx catalyst age is determined independently of the temperature catalyst age.

18. The method of claim 17, wherein the cumulative catalyst age is determined based on a weighted average of the NOx catalyst age and the temperature catalyst age.

19. The method of claim 17, wherein the NOx catalyst age is determined based on a look-up table, and wherein the temperature catalyst age is determined based on a look-up table.

* * * * *